United States Patent
Sakagami et al.

(10) Patent No.: US 10,252,936 B2
(45) Date of Patent: Apr. 9, 2019

(54) NEAR-INFRARED CUT FILTER GLASS

(71) Applicant: AGC Inc., Chiyoda-ku (JP)

(72) Inventors: Takahiro Sakagami, Haibara-gun (JP); Takeshi Yamaguchi, Haibara-gun (JP); Makoto Shiratori, Haibara-gun (JP)

(73) Assignee: AGC Inc., Chiyoda-ku (JP)

( * ) Notice: Subject to any disclaimer, the term of this patent is extended or adjusted under 35 U.S.C. 154(b) by 0 days.

(21) Appl. No.: 15/785,846

(22) Filed: Oct. 17, 2017

(65) Prior Publication Data

US 2018/0037492 A1  Feb. 8, 2018

Related U.S. Application Data

(63) Continuation of application No. PCT/JP2016/062768, filed on Apr. 22, 2016.

(30) Foreign Application Priority Data

Apr. 24, 2015  (JP) ................. 2015-089775

(51) Int. Cl.
| | | |
|---|---|---|
| C03C 3/19 | (2006.01) | |
| C03C 3/17 | (2006.01) | |
| C03C 4/08 | (2006.01) | |
| G02B 5/20 | (2006.01) | |
| G02B 5/22 | (2006.01) | |

(52) U.S. Cl.
CPC ............... *C03C 3/19* (2013.01); *C03C 3/17* (2013.01); *C03C 4/08* (2013.01); *C03C 4/082* (2013.01); *G02B 5/208* (2013.01); *G02B 5/226* (2013.01)

(58) Field of Classification Search
CPC .... C03C 3/17; C03C 3/19; C03C 4/02; C03C 4/08; C03C 4/082
See application file for complete search history.

(56) References Cited

U.S. PATENT DOCUMENTS

| 5,668,066 A | 9/1997 | Oguma et al. |
|---|---|---|
| 2013/0069024 A1 | 3/2013 | Suzuki |

FOREIGN PATENT DOCUMENTS

| JP | 63-35434 | 2/1988 | |
|---|---|---|---|
| JP | 6-234546 | 8/1994 | |
| JP | 9-100136 | 4/1997 | |
| JP | 2005-320178 | 11/2005 | |
| JP | 2006-213546 | 8/2006 | |
| JP | 2006-248850 | 9/2006 | |
| JP | 2007-290886 | 11/2007 | |
| JP | 2010-8908 | 1/2010 | |
| JP | 2010008908 A * | 1/2010 | |
| JP | 2011-132077 | 7/2011 | |
| JP | 2011-168455 | 9/2011 | |
| JP | 2012-224491 | 11/2012 | |
| JP | 2012224491 A * | 11/2012 | |
| JP | 2014-125395 | 7/2014 | |
| JP | 2014125395 A * | 7/2014 | ............. C03C 3/247 |
| JP | 5672300 | 2/2015 | |
| JP | 2015-78086 | 4/2015 | |
| WO | WO 2011/118724 A1 | 9/2011 | |
| WO | WO 2014/103675 A1 | 7/2014 | |

OTHER PUBLICATIONS

International Search Report dated Jun. 14, 2016 in PCT/JP2016/062768, filed on Apr. 22, 2016 (with English Translation).
Written Opinion dated Jun. 14, 2016 in PCT/JP2016/062768, filed on Apr. 22, 2016.

* cited by examiner

*Primary Examiner* — Elizabeth A. Bolden
(74) *Attorney, Agent, or Firm* — Oblon, McClelland, Maier & Neustadt, L.L.P.

(57) ABSTRACT

A near-infrared cut filter glass includes: P, Al, R (R represents any one or more of Li, Na, and K), R' (R' represents any one or more of Mg, Ca, Sr, Ba, and Zn), and Cu, and not including F practically, wherein ($Cu^+$ amount/total Cu amount)×100[%] is 0.01 to 7.0%. The filter glass may further include, by mol %, 0 to 10% $B_2O_3$. The filter glass may have a fracture toughness value of the near-infrared cut filter glass is 0.3 MPa·$m^{1/2}$ or more. For the filter glass, a quotient obtained by dividing an absorption constant at a wavelength of 430 nm by an absorption constant at a wavelength of 800 nm, of the near-infrared cut filter glass, may be 0.00001 to 0.19.

12 Claims, No Drawings

NEAR-INFRARED CUT FILTER GLASS

CROSS REFERENCE TO RELATED APPLICATIONS

This application is a continuation of prior International Application No. PCT/JP2016/062768, filed on Apr. 22, 2016 which is based upon and claims the benefit of priority from Japanese Patent Application No. 2015-089775 filed on Apr. 24, 2015; the entire contents of all of which are incorporated herein by reference.

TECHNICAL FIELD

The present invention relates to a near-infrared cut filter glass which is used for a color correction filter of a digital still camera, a color video camera, or the like and is excellent in transmitting property of light particularly of a visible range, and in strength.

BACKGROUND

A solid-state image sensor such as a CCD and a CMOS which is used in a digital still camera or the like has a spectral sensitivity from a visible range to a near-infrared range around 1200 nm. Thus, since the solid-state image sensor as it is cannot obtain good color reproducibility, a near-infrared cut filter glass to which a specific substance absorbing infrared ray is added is used to correct a visibility of the solid-state image sensor. As the near-infrared cut filter glass, in order to selectively absorb light of a wavelength of a near-infrared range and to have a high weather resistance, an optical glass obtained by adding Cu to a phosphate-based glass is developed and used. Compositions of such glasses are disclosed in Japanese Patent Application Publication 2010-008908 A.

SUMMARY OF THE INVENTION

Problems to be Solved by the Invention

A camera or the like using a solid-state image sensor is being made smaller and thinner. Along with the above, an imaging device and a device provided therewith are similarly required to be made smaller and thinner. When a near-infrared cut filter glass obtained by adding Cu to a phosphate-based glass is made into a thin sheet, it is necessary to increase a concentration of a Cu component which influences an optical characteristic. However, there was a problem that increasing the concentration of the Cu component in the glass decreases a transmittance of light of a visible range, although it brings about a desirable value of an optical characteristic on an infrared side.

Further, when the near-infrared cut filter glass obtained by adding Cu to the phosphate-based glass is made into the thin sheet, the strength of the glass itself is required to be increased. A near-infrared cut filter glass having been conventionally used is low in strength, which arises a problem in practical application that the glass is likely to break when made into a thin sheet.

An object of the present invention is to provide a near-infrared cut filter glass which is excellent in optical characteristic that a transmittance of light of a visible range is high and that a transmittance of light of a near-infrared range is low even when a concentration of a Cu component in the glass is increased as the glass is made into a thin sheet, and which has a high strength even when the glass is made into the thin sheet.

Means for Solving the Problems

The present inventors, as a result of keen studies, has found that in a composition series having a high strength even when made into a thin sheet, a near-infrared cut filter glass which has unprecedented excellent optical characteristics can be obtained by strictly controlling a valence of a Cu component in the glass.

In other words, a near-infrared cut filter glass of the present invention is a near-infrared cut filter glass including: P, Al, R, R', and Cu, and not including F practically, wherein ($Cu^+$ amount/total Cu amount)×100[%] is 0.01 to 7.0%. In this specification, the expression of "$Cu^+$ amount/total Cu amount" means a quotient of $Cu^+$ amount divided by total Cu amount. R represents any one or more of Li, Na, and K; and R' represents any one or more of Mg, Ca, Sr, Ba, and Zn.

Further, in a preferable embodiment of the near-infrared cut filter glass of the present invention, the near-infrared cut filter glass further includes, by mol %, 0 to 10% $B_2O_3$.

Further, in a preferable embodiment of the near-infrared cut filter glass of the present invention, a fracture toughness value of the near-infrared cut filter glass is 0.3 MPa·m$^{1/2}$ or more.

Further, in a preferable embodiment of the near-infrared cut filter glass of the present invention, a quotient obtained by dividing an absorption constant at a wavelength of 430 nm by an absorption constant at a wavelength of 800 nm, of the near-infrared cut filter glass, is 0.00001 to 0.19.

Further, in a preferable embodiment of the near-infrared cut filter glass of the present invention, a transmittance at a wavelength of 430 nm at a thickness of 0.3 mm of the near-infrared cut filter glass is 50 to 92%.

Further, in a preferable embodiment of the near-infrared cut filter glass of the present invention, the near-infrared cut filter glass includes, by mol %:

50 to 75% $P_2O_5$;
5 to 22% $Al_2O_3$;
0.5 to 20% $R_2O$;
0.1 to 25% R'O, and ZnO); and
0.1 to 15% CuO, where
$R_2O$ represents any one or more of $Li_2O$, $Na_2O$, and $K_2O$; and R'O represents any one or more of MgO, CaO, SrO, BaO.

When a numeric value range is indicated in this specification, the numeric value range includes numeric values listed therebefore and thereafter as a lower limit value and an upper limit value, as long as not particularly specified.

Advantages of the Invention

According to the present invention, in a composition series having a high strength even when made into a thin sheet, it is possible to obtain a near-infrared cut filter glass which is excellent in optical characteristic that a transmittance of light of a visible range is high and that a transmittance of light of a near-infrared range is low.

EMBODIMENTS OF THE INVENTION

Hereinafter, an embodiment of the present invention will be described.

A near-infrared cut filter glass of the present invention (hereinafter, sometimes referred to as a glass of the present invention) includes components of P, Al, R, R', and Cu, does not include F practically, and (Cu$^+$ amount/total Cu amount)×100[%] is 0.01 to 7.0%. R represents any one or more components of Li, Na, and K. That is, R represents any one or more alkali metals of Li, Na, and K, and it is indicated that at least one kind or more of the above is included. R' represents any one or more components of Mg, Ca, Sr, Ba, and Zn. That is, R' represents any one or more alkaline earth metals of Mg, Ca, Sr, Ba, and Zn, and it is indicated that at least one kind or more of the above is included.

In denotation of (Cu$^+$ amount/total Cu amount), the Cu$^+$ amount is indicated by weight %, and the total Cu amount is a total amount of Cu including Cu of monovalence, divalence, and other existing valences, indicated by weight %. In other words, regarding the Cu amount and the total Cu amount, with the glass of the present invention being set to 100 weight %, contents of Cu$^+$ and the total Cu amount in the glass are indicated by weight %.

In the near-infrared cut filter glass, the Cu component in the glass absorbs light of a wavelength of a near-infrared range, and thus is required to exist as Cu$^{2+}$ (divalent). However, when a molten glass comes into a reduction condition, an existing ratio of Cu$^+$ (monovalent) which has an absorption characteristic at wavelengths of about 300 to 600 nm increases, and a transmittance at a wavelength of about 430 nm decreases. Thus, by making a ratio of the Cu amount in relation to the total Cu amount, in other words, (Cu$^+$ amount/total Cu amount)×100, be 0.01 to 7.0%, it is possible to absorb light of a wavelength of 700 nm or more while suppressing a decrease of a transmittance at the wavelength of about 430 nm.

When (Cu$^+$ amount/total Cu amount)×100 of the Cu component in the glass is over 7.0%, the transmittance at the wavelength of about 430 nm decreases, and it is not preferable. Further, when (Cu$^+$ amount/total Cu amount)×100 is less than 0.01%, an atmosphere at a time of manufacturing a molten glass is required to be strictly controlled, which may result in an increase of a manufacturing cost. (Cu$^+$ amount/total Cu amount)×100 of the Cu component in the glass of the present invention is preferable to be 0.01 to 6.5%, more preferable to be 0.05 to 6.0%, further preferable to be 0.1 to 5.5%, yet further preferable to be 0.5 to 5.0%, and most preferable to be 1.0 to 4.5%.

Regarding the Cu component in the glass, the Cu$^+$ amount can be measured by an oxidation-reduction titration method and the total Cu amount can be measured by an ICP emission spectrometry.

The measuring method of the Cu$^+$ amount using the oxidation-reduction titration method is as follows.

First, a glass sample and reagents of NaVO$_3$, HF, and H$_2$SO$_4$ are put into a container and heated, so that Cu$^+$ and VO$_3^-$ react at 1:1. Thereby, Cu$^+$ is oxidized to Cu$^{2+}$, and VO$_3^-$ is reduced to Vo$_2^+$. Then a reagent of FeSO$_4$ is dropped into the above, so that Fe$^{2+}$ and residual VO$_3^-$ which has not reacted with Cu$^+$ react, and VO$_3^-$ is reduced to VO$_2^+$. Thereby, a residual VO$_3^-$ amount can be estimated from a dropped FeSO$_4$ amount, and a VO$_3^-$ amount having reacted with Cu can be found from a difference between an original amount of VO$_3^-$ of the reagent and the residual VO$_3^-$ amount. Since Cu$^+$ has reacted with VO$_3^-$ at 1:1, it becomes that reacted VO$_3^-$ amount=Cu$^+$ amount.

In the glass of the present invention, it is preferable that a quotient obtained by dividing an absorption constant at the wavelength of 430 nm by an absorption constant at a wavelength of 800 nm, which is absorption constant at wavelength of 430 nm/absorption constant at wavelength of 800 nm, is within a range of 0.00001 to 0.19.

An absorption constant is a constant indicating how much light a medium absorbs when light is incident into that medium, and has a dimension of inverse number of length. According to the Lambert-Beer's law, a logarithm (absorbance) of a ratio of a strength of light having passed through a medium by a certain distance to a strength of incident light bears a proportional relationship to the passed distance, and a proportional coefficient thereof is referred to as an absorption constant. When the absorption constant is high, the amount of light transmitting the glass is small, and when the absorption constant is low, the amount of light transmitting the glass is large.

The transmittance of light of the wavelength of 430 nm has correlation with the content of Cu$^+$ in the glass, and the absorption constant at the wavelength of 430 nm becomes higher as the content of Cu$^+$ becomes larger. Further, the transmittance of light of the wavelength of 800 nm has correlation with the content of Cu$^{2+}$ in the glass, and the absorption constant at the wavelength of 800 nm becomes higher as the content of Cu$^{2+}$ becomes larger. Thus, as the near-infrared cut filter glass, it is preferable that the absorption constant at the wavelength of 430 nm is low and that the absorption constant at the wavelength of 800 nm is high. The absolute value of the absorption constant changes depending on the content of the Cu component in the glass. Therefore, as a result of making a quotient obtained by dividing the absorption constant at the wavelength of 430 nm by the absorption constant at the wavelength of 800 nm be within a range of 0.00001 to 0.19, it is possible to obtain a near-infrared cut filter glass which has a good balance of transmission characteristics of light of the visible range and the near-infrared range, regardless of the content of the Cu component in the glass.

If the quotient obtained by dividing the absorption constant at the wavelength of 430 nm by the absorption constant at the wavelength of 800 nm is over 0.19, the transmittance at the wavelength of about 430 nm decreases, and it is not preferable. Further, if that quotient is less than 0.00001, in order to make the content of Cu$^+$ small, the atmosphere at the time of manufacturing the molten glass is required to be strictly controlled, which may result in an increase of the manufacturing cost. The quotient obtained by dividing the absorption constant at the wavelength of 430 nm by the absorption constant at the wavelength of 800 nm is more preferable to be 0.00005 to 0.17, further preferable to be 0.0001 to 0.15, yet further preferable to be 0.0005 to 0.13, and especially preferable to be 0.001 to 0.12.

Regarding a calculation method of the absorption constant in the present invention, measurement is performed in a form of a glass plate and calculation is carried out, as described below. Both surfaces of the glass plate are mirror-polished and a thickness t of the glass plate is measured. A spectral transmittance T of this glass plate is measured. For example, an ultraviolet-visible-near-infrared spectrophotometer V-570 manufactured by JASCO Corporation is used. Then, an absorption constant β is calculated by using a relational expression of $T=10^{-\beta t}$.

The glass of the present invention is preferable to have a transmittance at the wavelength 430 nm in a range of 50 to 92% in spectral transmittance at a thickness of 0.3 mm. Thereby, a glass having a high transmittance of light of the visible range can be obtained.

In the spectral transmittance at the thickness of 0.3 mm, if the transmittance at the wavelength of 430 nm is less than 50%, the transmittance at the wavelength of about 430 nm is too low and influences a color tone when used for an imaging device, and thus such a transmittance is not preferable. Further, if the transmittance is over 92%, the atmosphere at the time of manufacturing the molten glass is required to be strictly controlled in order to make the content of $Cu^+$ small, which may result in an increase of the manufacturing cost. In the spectral transmittance at the thickness of 0.3 mm of the near-infrared cut filter glass, the transmittance at the wavelength of 430 nm is more preferable to be 60 to 91%, and further preferable to be 65 to 90%.

The glass of the present invention is preferable to include, by mol %:
50 to 75% $P_2O_5$;
5 to 22% $Al_2O_3$;
0.5 to 20% $R_2O$;
0.1 to 25% R'O; and
0.1 to 15% CuO,
where $R_2O$ represents any one or more substances of $Li_2O$, $Na_2O$, and $K_2O$; and R'O represents any one or more substances of MgO, CaO, SrO, BaO, and ZnO.

The reason why the contents (indicated by mol %) of components constituting the glass of the present invention is prescribed as above will be described hereinafter.

In this specification, a content of each component and a total content are indicated by mol % and a $Cu^+$ amount and a total Cu amount are indicated by weight %, as long as not specified otherwise.

$P_2O_5$ is a main component to form a glass, and is an essential component for increasing a cutting property of light of a near-infrared range. However, the content less than 50% cannot bring about a sufficient effect of the cutting property, and the content over 75% leads to a problem that the glass becomes unstable, that a weather resistance is lowered, or the like, and thus such contents are not preferable. The content of $P_2O_5$ is more preferably 52 to 73%, further preferably 54 to 70%, and yet further preferably 55 to 65%.

$Al_2O_3$ is a main component to form a glass, and is an essential component for increasing a weather resistance of the glass, increasing the strength of the glass, and so on. However, the content less than 5% cannot bring about such effects sufficiently and the content over 22% leads to a problem that the glass becomes unstable, that an infrared cutting property is lowered, or the like, and thus such contents are not preferable. The content of $Al_2O_3$ is more preferably 7 to 20%, and further preferably 9 to 18%.

$R_2O$ ($R_2O$ represents any one or more substances of $Li_2O$, $Na_2O$, and $K_2O$) is an essential component for lowering the melting temperature of the glass, lowering the liquidus temperature of the glass, stabilizing the glass, and so on. However, the content less than 0.5% cannot bring about such effects sufficiently and the content over 20% makes the glass unstable, and thus such contents are not preferable. The content of $R_2O$ is more preferably 1 to 18%, further preferably 1.5 to 16%, and yet further preferably 2 to 15%.

$Li_2O$ is a component for lowering the melting temperature of the glass, lowering the liquidus temperature of the glass, stabilizing the glass, and so on. If $Li_2O$ is included, its content is preferable to be 0 to 10%. The content over 10% makes the glass unstable, and thus is not preferable. The content of $Li_2O$ is more preferably 0.5 to 8%, and further preferably 1 to 7%.

$Na_2O$ is a component for lowering the melting temperature of the glass, lowering the liquidus temperature of the glass, stabilizing the glass, and so on. If $Na_2O$ is included, its content is preferable to be 0 to 20%. The content over 20%, makes the glass unstable, and thus is not preferable. The content of $Na_2O$ is more preferably 0.7 to 18%, and further preferably 1 to 16%.

$K_2O$ is a component having effects of lowering the melting temperature of the glass, lowering the liquidus temperature of the glass, and so on. If $K_2O$ is included, its content is preferable to be 0 to 15%. The content over 15% makes the glass unstable, and thus is not preferable. The content of $K_2O$ is more preferably 0.5 to 13%, and further preferably 0.7 to 10%.

A near-infrared cut filter glass may include $B_2O_3$ in a range of 0 to 10% or less in order to stabilize the glass, although $B_2O_3$ is not an essential component. The content over 10% may make a melting temperature too high, and thus is not very preferable. The content of $B_2O_3$ is preferably 0 to 9%, more preferably 0 to 8.5%, further preferably 0 to 8%, and most preferably 0 to 7.5%.

R'O (R'O represents any one or more substances of MgO, CaO, SrO, BaO, and ZnO) is an essential component for lowering the melting temperature of the glass, lowering the liquidus temperature of the glass, stabilizing the glass, increasing the strength of the glass, and so on. However, the content less than 0.1% cannot bring about such effects sufficiently and the content over 25% leads to a problem that the glass becomes unstable, that an infrared cutting property is lowered, that the strength of the glass is lowered, or the like, and such contents are not preferable. The content of R'O is more preferably 1 to 23%, further preferably 1.5 to 22%, yet further preferably 2 to 20%, and most preferably 2.5 to 19%.

MgO is a component for lowering the melting temperature of the glass, lowering the liquidus temperature of the glass, stabilizing the glass, increasing the strength of the glass, and so on. If MgO is included, its content is preferable to be 1 to 15%. The content less than 1% cannot bring about such effects sufficiently and the content over 15% makes the glass unstable, and thus such contents are not preferable. The content of MgO is more preferably 1.5 to 13%, and further preferably 2 to 10%.

CaO is a component for lowering the melting temperature of the glass, lowering the liquidus temperature of the glass, stabilizing the glass, increasing the strength of the glass, and so on. If CaO is included, its content is preferable to be 0.1 to 10%. The content less than 0.1% cannot bring about such effects sufficiently and the content over 10% makes the glass unstable, and thus such contents are not preferable. The content of CaO is more preferably 0.3 to 8%, and further preferably 0.5 to 6%.

SrO is a component for lowering the melting temperature of the glass, lowering the liquidus temperature of the glass, stabilizing the glass, and so on. If SrO is included, its content is preferable to be 1 to 10%. The content less than 1% cannot bring about such effects sufficiently and the content over 10% makes the glass unstable, and thus such contents are not preferable. The content of SrO is more preferably 0.3 to 8%, and further preferably 0.5 to 8%.

BaO is a component for lowering the melting temperature of the glass, lowering the liquidus temperature of the glass, stabilizing the glass, and so on. If BaO is included, its content is preferable to be 0.1 to 10%. The content less than 0.1% cannot bring about such effects sufficiently and the content over 10% makes the glass unstable, and thus such contents are not preferable. The content of BaO is more preferably 0.5 to 8%, and further preferably 1 to 6%.

ZnO has effects of lowering the melting temperature of the glass, lowering the liquidus temperature of the glass, and so on. If ZnO is included, its content is preferable to be 0.5 to 15%. The content less than 0.5% cannot bring about such effects sufficiently and the content over 15% deteriorates the solubility of the glass, and thus such contents are not preferable. The content of ZnO is more preferably 1 to 13%, and further preferably 1.5 to 10%.

CuO is an essential component for cutting infrared ray. However, the content less than 0.1% cannot bring about an effect of infrared ray cutting sufficiently when the thickness of the glass is made small and the content over 15% lowers the transmittance in a visible range, and thus such contents are not preferable. The content of CuO is more preferably 0.1 to 14.5%, and further preferably 0.2 to 14%, and yet further preferably 0.5 to 13.5%.

Further, the total Cu amount is a total amount of Cu indicated by weight % including Cu of monovalence, divalence, and other existing valences. When the glass of the present invention is set to 100 weight %, in that glass, the total Cu amount is preferable to be 0.1 to 15 weight %. Similarly to in the above-described case of CuO, the total Cu amount less than 0.1 weight % cannot bring about an effect of infrared ray cutting when the thickness of the glass is made small and the total Cu amount over 15% lowers the transmittance in a visible range, and thus such amounts are not preferable. Note that the content of the $Cu^+$ amount can be decided in a range where ($Cu^+$ amount/total Cu amount)× 100[%] becomes 0.01 to 7.0% by weight %.

$Sb_2O_3$ has an effect of increasing a transmittance in a visible range by increasing oxidizing of the glass and suppressing an increase of a concentration of $Cu^+$ ions, although $Sb_2O_3$ is not an essential component. If $Sb_2O_3$ is included, its content is preferable to be 0.01 to 2%. The content over 2% lowers stability of the glass and thus is not preferable. The content of $Sb_2O_3$ is more preferably 0.02 to 2%, further preferably 0.05 to 1.8%, yet further preferably 0.1 to 1.6%, and most preferably 0.9 to 1.5%.

In the near-infrared cut filter glass of the present invention, F is a component effective in increasing a weather resistance. However, F is an environment-affecting substance, so that F is preferable not to be included practically.

In this specification, "not included practically" means not being intentionally used as a raw material, and an inevitable impurity mixed from a raw material component or a manufacturing process is regarded as not being included.

It is preferable that the glass of the present invention does not include PbO, $As_2O_3$, or $V_2O_5$ practically. PbO is a component which lowers a viscosity of the glass to improve manufacturing workability. Further, $As_2O_3$ is a component which acts as an excellent fining agent capable of generating fining gas in a broad temperature range. However, PbO and $As_2O_3$ are environment-affecting substances, and thus are desirable not to be included as far as possible. Since $V_2O_5$ absorbs light of a wavelength of the visible range, it is desirable that $V_2O_5$ is not included as far as possible in a near-infrared cut filter glass for solid-state image sensor of which a high transmittance in the visible range is required.

A nitrate compound or a sulfate compound which has a cation forming a glass can be added to the glass of the present invention as an oxidizing agent or a fining agent. The oxidizing agent has an effect of adjusting $Cu^+$ amount/total Cu amount of a Cu component in a glass to a desired range. An additive amount of the nitride compound or the sulfate compound is preferable to be 0.5 to 10 mass % in outer percentage addition in relation to a total amount of raw material mixture of a composition of the above-described glass. The additive amount less than 0.5 mass % does not have an effect of transmittance improvement and the additive amount over 10 mass % makes formation of the glass difficult. The additive amount of the nitride compound or the sulfate compound is more preferably 1 to 8 mass %, and further preferably 3 to 6%. Examples of the nitride compound include $Al(NO_3)_3$, $LiNO_3$, $NaNO_3$, $KNO_3$, $Mg(NO_3)_2$, $Ca(NO_3)_2$, $Sr(NO_3)_2$, $Ba(NO_3)_2$, $Zn(NO_3)_2$, and $Cu(NO_3)_2$. Examples of the sulfate compound include $Al_2(SO_4)_3 \cdot H_2O$, $Li_2SO_4$, $Na_2SO_4$, $K_2SO_4$, $MgSO_4$, $CaSO_4$, $SrSO_4$, $BaSO_4$, $ZnSO_4$, and $CuSO_4$.

The near-infrared cut filter glass of the present invention copes with a requirement of making an imaging device and a device provided therewith smaller and thinner, and can obtain a good spectral characteristic even in a state where the thickness of the glass is small. The thickness of the glass, in a case of the glass plate of a plate-shaped body, is preferable to be less than 1 mm, more preferable to be less than 0.8 mm, further preferable to be less than 0.6 mm, and most preferable to be less than 0.4 mm. Further, a lower limit value of the thickness of the glass is not limited in particular, but in consideration of a strength enabling avoiding breakage in manufacturing of the glass or in transportation at a time of mounting on an imaging device, the lower limit value is preferable to be 0.1 mm or more.

A fracture toughness value of the near-infrared cut filter of the present invention is preferable to be 0.3 $MPa \cdot m^{1/2}$ or more. The fracture toughness value less than 0.3 $MPa \cdot m^{1/2}$ cannot bring about a sufficient toughness when the glass is made into a thin sheet, leading to a probability of fracture or the like of the glass at a time of usage. The fracture toughness value of the near-infrared cut filter glass is preferably 0.35 $MPa \cdot m^{1/2}$ or more, more preferably 0.4 $MPa \cdot m^{1/2}$ or more, further preferably 0.43 $MPa \cdot m^{1/2}$ or more, and most preferably 0.45 $MPa \cdot m^{1/2}$ or more.

The glass of the present invention may be provided with an optical thin film such as an antireflection film, an infrared cut film and an ultraviolet cut film in a glass surface. Such an optical thin film is made of a single layer film or a multilayer film, and can be formed by a well-known method such as a vapor disposition method and a sputtering method.

The near-infrared cut filter glass of the present invention can be fabricated as follows, for example. First, raw materials are weighed and mixed so that a composition of an obtained glass may fall within the above-described composition range. This raw material mixture is housed in a platinum crucible, heated and melted at a temperature of 700 to 1400 degrees centigrade in an electric furnace. After sufficient stirring and fining, a melt is casted into a mold, gradually cooled, and thereafter, a molten substance is cut and polished to be formed into a flat-plate shape having a predetermined thickness. Thereby, the near-infrared cut filter glass is manufactured. In the above-described manufacturing method, a highest temperature of the glass melt during glass melting is preferable to be made 1400 degrees centigrade or lower. The highest temperature over 1400 degrees centigrade of the glass melt during glass melting makes an equilibrium state of oxidation-reduction of a Cu ion biased on a $Cu^+$ side, leading to a problem that a transmittance characteristic of the near-infrared cut filter glass deteriorates. Therefore, that temperature is more preferable to be 1350 degrees centigrade or lower, and most preferable to be 1300 degrees centigrade or lower. Further, if the highest temperature of the glass melt during melting becomes too low, there arises a problem that crystallization occurs during melting, that melt-down takes time, or the like. Thus, that temperature is preferable to be 700 degrees centigrade or higher, and more preferable to be 750 degrees centigrade or higher.

EXAMPLES

Hereinafter, the present invention will be described in detail by way of examples, but the present invention is not limited to the following examples.

The examples and comparative examples of the present invention are shown in Table 1. Examples 1 to 4 are examples of the present invention and Example 5 is a comparative example of the present invention.

First, raw materials were weighed and mixed so that a composition (mol shown in Table 1 can be obtained, a raw material mixture is put into a platinum crucible of about 400 cc in internal volume, and the raw material mixture was melted at a melting temperature depicted in Table 1 for two hours. Thereafter, fining and stirring were carried out, a melt was casted into a rectangular mold of 100 mm in length, 80 mm in breadth, and 20 mm in height which was preheated to about 300 to 500 degrees centigrade, and thereafter, gradually cooled at about 1 degrees centigrade/min to thereby obtain a glass of a sample. In Table 1, $Cu^+$ amounts and total Cu amounts are indicated by weight %.

Regarding a solubility or the like of the glass, visual observation was carried out at a time of fabricating the above-described sample, and it was confirmed that the obtained glass sample did not have a bubble or a striae.

Note that the raw materials used for each glass are as follows. At least one kind of substance selected from $H_3PO_4$, $Al(PO_3)_3$, $Mg(PO_3)_2$, $Zn(PO_3)_2$, and $Cu(PO_3)_2$ was used for $P_2O_5$; $Al(PO_3)_3$ was used for $Al_2O_3$; $Li_2O$ was used for $LiNO_3$; $NaNO_3$ was used for $Na_2O$; $KNO_3$ was used for $K_2O$; $PBO_4$ and/or $H_3BO_3$ were (was) used for $B_2O_3$; $CaCO_3$ was used for CaO; MgO and/or $Mg(PO_3)_2$ were (was) used for MgO; $BaCO_3$ was used for BaO; an oxide and/or $Zn(PO_3)_2$ were (was) used for ZnO; and an oxide and/or $Cu(PO_3)_2$ were (was) used for CuO.

of 800 nm), a fracture toughness value, and a weather resistance, by following methods.

The transmittance was evaluated by using an ultraviolet-visible-near-infrared spectrophotometer (manufactured by JASCO Corporation; brand name: V-570). More specifically, a plate-shaped glass sample of 40 mm in length, 30 mm in breadth, and 0.3 mm in thickness whose both surfaces were optically polished was prepared, and measurement of the transmittance was carried out.

Regarding the weather resistance, by using a high-temperature/high-humidity tank (manufactured by ESPEC CORP.; brand name: PL-1J), the above glass sample having been optically polished was kept in the high-temperature/high-humidity tank of 85 degrees centigrade and 85% in relative humidity for 120 hours, and a burnt state of the glass surface thereafter was visually observed. Then, one in which burning is indistinctive was rated as A (that is, no problem in weather resistance).

Regarding the fracture toughness value, by using a Vickers hardness meter (manufacture by FUTURE-TECH CORP.; brand name: FLC-50V), a Vickers indenter was hit in an optically polished glass surface of 0.3 mm in thickness, and the fracture toughness value was calculated from a length of an indentation and a crack length by using a calculating formula listed in JIS R 1607.

Regarding the absorption constant, by using the aforementioned ultraviolet-visible-near-infrared spectrophotometer, transmittances of the above glass sample at the wavelength of 430 nm and the wavelength of 800 nm were measured, and the absorption constant was calculated with

TABLE 1

| mol % | Example 1 | Example 2 | Example 3 | Example 4 | Example 5 |
|---|---|---|---|---|---|
| $P_2O_5$ | 62.0 | 58.6 | 57.6 | 55.2 | 55.2 |
| $Al_2O_3$ | 17.5 | 9.5 | 15 | 10 | 10 |
| $Li_2O$ | 3.0 | | 2.4 | | |
| $Na_2O$ | | 14.4 | 2.4 | | |
| $K_2O$ | | | 1.6 | 9 | 9 |
| $B_2O_3$ | 6.0 | 2.3 | | | |
| CaO | 1.0 | | | | |
| MgO | 3.0 | | 4 | 9 | 9 |
| SrO | | | | | |
| BaO | | 3.5 | 2 | 2 | 2 |
| ZnO | | | 7 | 7 | 7 |
| CuO | 7.5 | 11.7 | 8 | 7.8 | 7.8 |
| $Cu^+$ amount (wt %) | 0.14 | 0.14 | 0.14 | 0.11 | 0.31 |
| Total Cu amount (wt %) | 4.10 | 6.82 | 4.33 | 4.18 | 4.20 |
| ($Cu^+$ amount/total Cu amount) × 100 [%] | 3.4 | 2.0 | 3.1 | 2.6 | 7.3 |
| Melting temperature [degrees centigrade] | 1250 | 1120 | 1120 | 1100 | 1250 |
| Transmittance (430 nm) [%] | 85.5 | 84.7 | 87.1 | 86.7 | 79.5 |
| Absorption constant (wavelength: 430 nm) [$mm^{-1}$] | 0.09 | 0.11 | 0.07 | 0.072 | 0.198 |
| Absorption constant (wavelength: 800 nm) [$mm^{-1}$] | 4.16 | 6.75 | 5.01 | 4.73 | 4.56 |
| Absorption constant (wavelength: 430 nm)/absorption constant (wavelength: 800 nm) | 0.022 | 0.016 | 0.013 | 0.015 | 0.043 |
| Fracture toughness [$MPa \cdot m^{1/2}$] | 0.75 | 0.5 | 0.6 | >0.5 | >0.5 |
| Weather resistance | A | A | A | A | A |

Regarding the glass fabricated as above, there were evaluated or calculated $Cu^+$ amount/total Cu amount, a transmittance at a wavelength of 430 nm (plate thickness: 0.3 mm), absorption constants (wavelength of 430 nm and wavelength of 800 nm), a fracture toughness value, and a weather reflection losses in the front and rear surfaces being eliminated. A value of the transmittance was converted into a value at a thickness of 0.3 mm. For the conversion of the thickness, the following Formula 1 was used. Note that $T_{i1}$ represents a transmittance of a measured sample, $t_1$ represents a thickness of the measured sample, $T_{i2}$ represents a transmittance of a conversion value, and $t_2$ represents a thickness to be converted into (0.3 in a case of the present invention).

[Numerical Formula 1]

$$T_{i2} = T_{i1}^{\frac{t_2}{t_1}}$$ Formula 1

Regarding the Cu component in the glass, the $Cu^+$ amount was measured by an oxidation-reduction titration method and the total Cu amount was measured by an ICP emission spectrometry (device name: ICPE-9000, manufactured by SHIMADZU CORPORATION). The oxidation-reduction titration method used for measurement of the $Cu^+$ amount of the Cu component in the glass was carried out by a procedure of the following steps (1) to (4).

(1) As a reagent there was prepared a mixed solution which includes 5 ml of $N/60NaVO_3$, 20 ml of HF, and 3 ml of $(1+1)H_2SO_4$ (this $(1+1)H_2SO_4$ represents a sulfate solution including $H_2O$ in relation to $H_2SO_4$ at a volume rate of 1:1). Then, there were prepared a platinum container (A) housing this reagent and 0.5 g of the glass sample to be measured and a platinum container (B) housing only the reagent.

(2) The platinum containers (A) and (B) were heated respectively; and as for the platinum container (A), the glass sample was decomposed by heat. By this decomposition by heat, $Cu^+$ in the glass sample reacted with $VO_3^-$ in the reagent at a rate of 1:1, to generate $Cu^+$ and $VO_2^+$. Heating was started from about 150 degrees centigrade with a temperature being gradually raised, and finally carried out at 250 to 300 degrees centigrade (a heating time was 2 to 3 hours). In the glass sample, $Cu^+$ in the glass was oxidized to $Cu^{2+}$ by $VO_3^-$ during the heat decomposition, and $VO_3^-$ was reduced to $VO_2^+$. After the glass sample was decomposed by heat, respective solutions were transferred from the platinum containers (A) and (B) to beakers by using $(1+100)\ H_2SO_4$, so that liquids in beakers measured about 200 ml. The expression "$(1+100)\ H_2SO_4$" represents a sulfate solution including $H_2O$ in relation to $H_2SO_4$ at a volume rate of 100.

(3) $VO_3^-$ in the solutions having been transferred respectively from the platinum containers (A) and (B) were subjected to oxidation-reduction titration by using $N/240FeSO_4$, to thereby obtain dropped amounts of $N/240FeSO_4$ required for reducing $VO_3^-$ to $VO_2^+$. For titration, a titration device (manufactured by HIRANUMA SANGYO Co., Ltd., automatic titration device: COM-1600) was used. Here, $Fe^{2+}$ in a reducing agent and $Vo_3^-$ in a sulfate acidic solution reacted at a rate of 1:1 to thereby generate $Fe_3^+$ and $VO_2^+$.

(4) Since [dropped amount of $N/240FeSO_4$ to solution transferred from platinum container (B)]−[dropped amount of $N/240FeSO_4$ to solution transferred from platinum container (A)]=[$VO_3^-$ amount consumed by reaction with $Cu^+$ in glass sample] and $Cu^+$ in the glass sample and $VO_3^-$ in the reagent react at the rate of 1:1 as described above, the $Cu^+$ amount in the glass sample was estimated from the amount of consumption of $VO_3^-$.

According to evaluation results, in the glasses of the examples, ($Cu^+$ amount/total Cu amount)×100[%] is within the range of 0.01 to 7.0%, further, the quotient obtained by dividing the absorption constant at the wavelength of 430 nm by the absorption constant at the wavelength of 800 nm is within the range of 0.00001 to 0.19, and the transmittance at the wavelength of 430 nm is 50 to 92% in spectral transmittance at the thickness of 0.3 mm, so that the transmittance of light of the visible range of the glass is high enough to be able to be suitably used as a near-infrared cut filter glass for a solid-state image sensor. Further, since the fracture toughness value is 0.3 $MPa \cdot m^{1/2}$ or more, it is possible to make the glass hard to break even when the glass is made into a thin sheet.

INDUSTRIAL APPLICABILITY

According to a near-infrared cut filter glass of the present invention, in a composition series having a high strength even when made into a thin sheet, a transmittance of light of a visible range of the glass is high even if a content of a Cu component is large, and thus the near-infrared cut filter glass of the present invention is quite useful for a near-infrared cut filter of an imaging device which is being made smaller and thinner.

What is claimed is:

1. A near-infrared cut filter glass comprising: P, Al, R, R', and Cu, and not comprising F practically, wherein
    R represents any one or more of Li, Na, and K;
    R' represents any one or more of Mg, Ca, Sr, Ba, and Zn; and
    ($Cu^+$ weight % amount/total Cu weight % amount)×100 [%] is 0.01 to 5.0%, wherein the near-infrared cut filter glass comprises, by mol %:
    50 to 75% $P_2O_5$;
    5 to 22% $Al_2O_3$;
    0.5 to 20% $R_2O$, wherein 0.5 to 15% is $K_2O$;
    0.1 to 20% R'O; and
    0.1 to 15% CuO.

2. The near-infrared cut filter glass according to claim 1, comprising, by mol %, 0 to 10% $B_2O_3$.

3. The near-infrared cut filter glass according to claim 1, comprising, by mol %, greater than 0 to 10% $B_2O_3$.

4. The near-infrared cut filter glass according to claim 1, comprising, by mol %, 2.3 to 10% $B_2O_3$.

5. The near-infrared cut filter glass according to claim 1, comprising, by mol %, 52 to 75% $P_2O_5$.

6. The near-infrared cut filter glass according to claim 1, comprising, by mol %, 1.6 to 10% $K_2O$.

7. The near-infrared cut filter glass according to claim 1, wherein the ($Cu^+$ weight % amount/total Cu weight % amount)×100[%] is 0.01 to 4.5%.

8. The near-infrared cut filter glass according to claim 1, wherein the ($Cu^+$ weight % amount/total Cu weight % amount)×100[%] is 0.05 to 4.5%.

9. The near-infrared cut filter glass according to claim 1, wherein a fracture toughness value of the near-infrared cut filter glass is 0.3 $MPa \cdot m^{1/2}$ or more.

10. The near-infrared cut filter glass according to claim 1, wherein a quotient obtained by dividing an absorption constant at a wavelength of 430 nm by an absorption constant at a wavelength of 800 nm, of the near-infrared cut filter glass, is 0.00001 to 0.19.

11. The near-infrared cut filter glass according to claim 1, wherein a transmittance at a wavelength of 430 nm at a thickness of 0.3 mm of the near-infrared cut filter glass is 50 to 92%.

12. The near-infrared cut filter glass according to claim 11, wherein the transmittance at a wavelength of 430 nm at a thickness of 0.3 mm of the near-infrared cut filter glass is 84.7 to 92%.

* * * * *